Nov. 25, 1924.
V. V. GUNSOLLEY
1,516,962
DOUGHNUT MACHINE
Filed Oct. 17, 1922
2 Sheets-Sheet 2
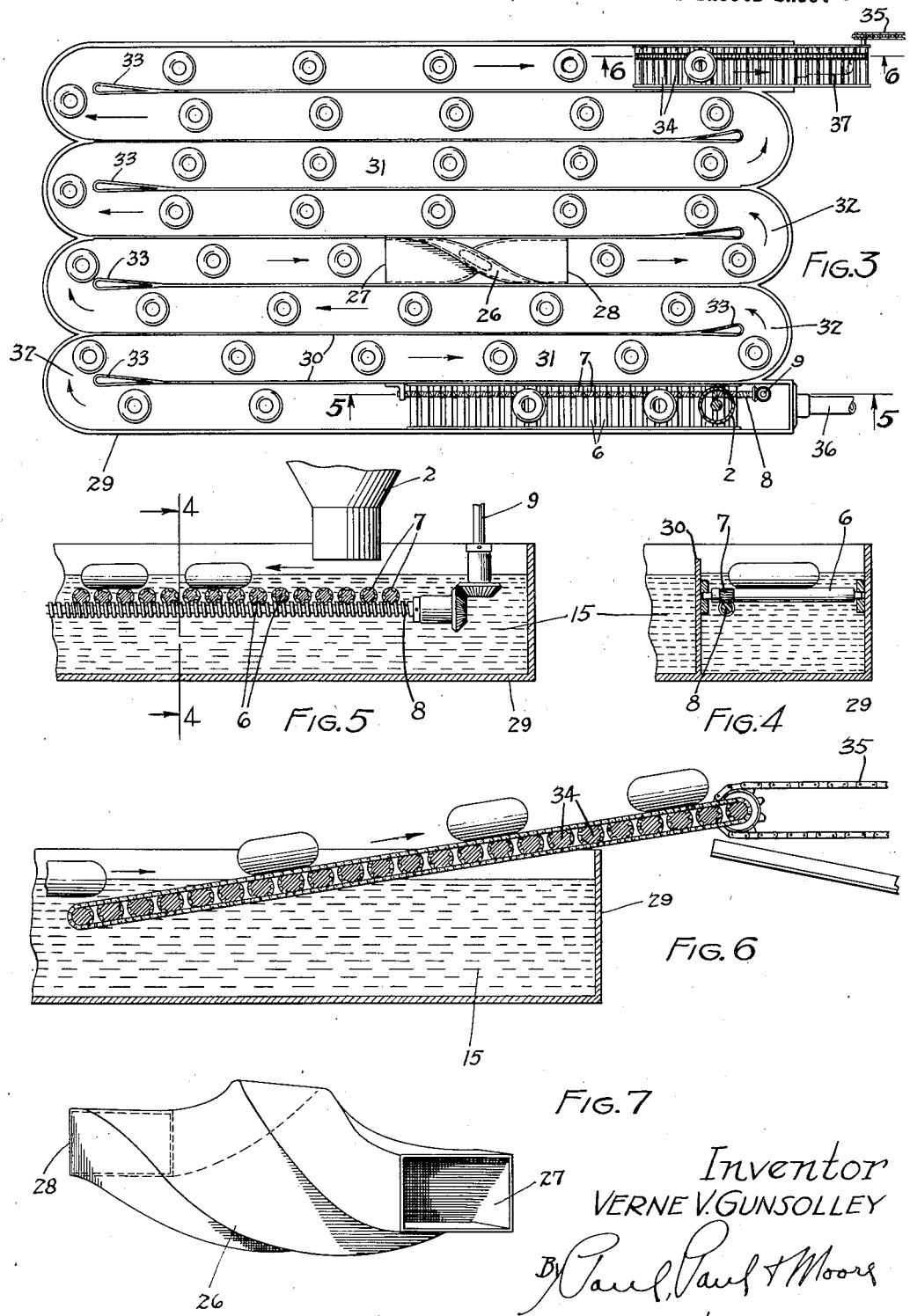
Inventor
VERNE V. GUNSOLLEY
ATTORNEYS Patented Nov. 25, 1924.

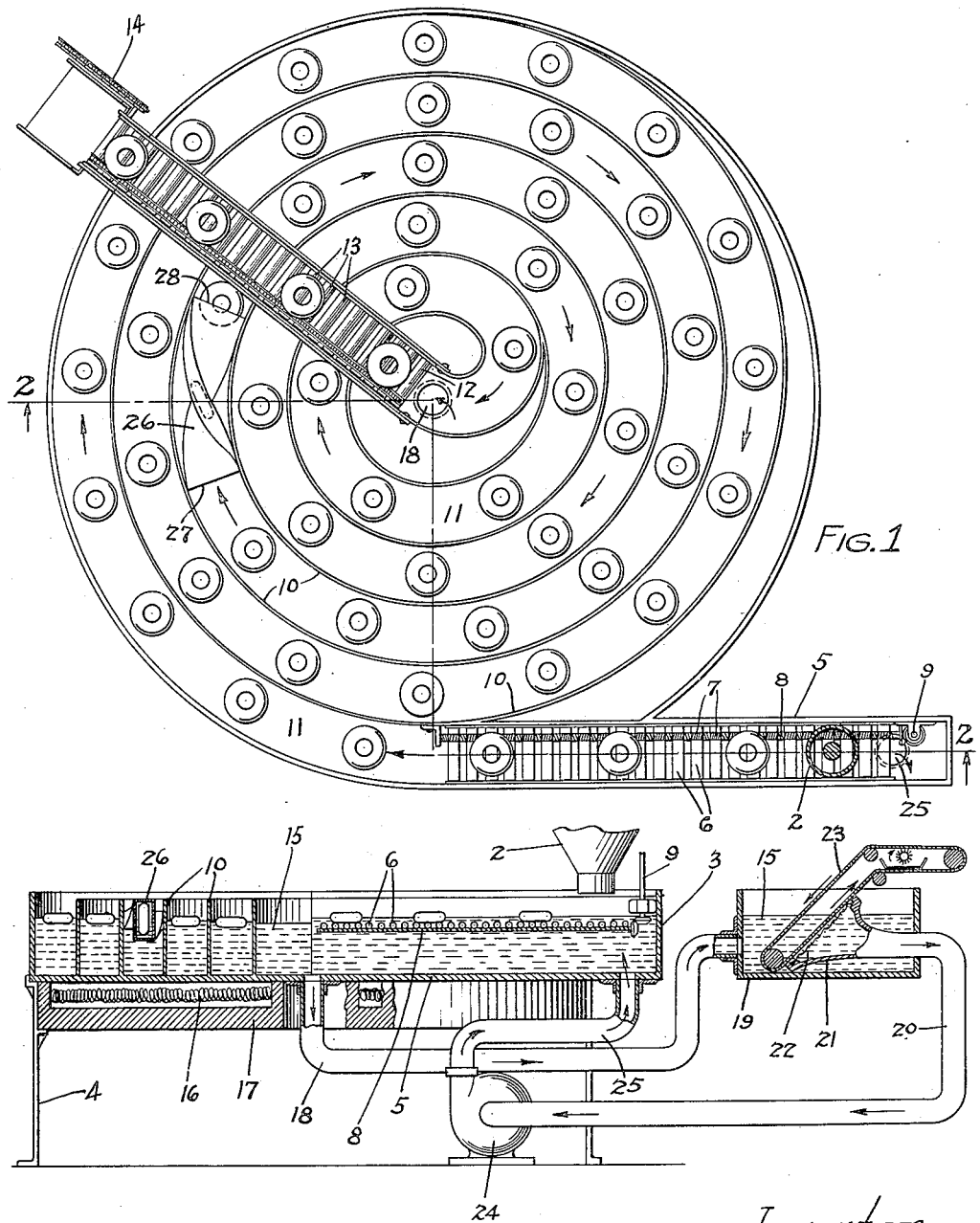

1,516,962

UNITED STATES PATENT OFFICE.

VERNE V. GUNSOLLEY, OF MINNEAPOLIS, MINNESOTA.

DOUGHNUT MACHINE.

Application filed October 17, 1922. Serial No. 595,152.

*To all whom it may concern:*

Be it known that I, VERNE V. GUNSOLLEY, a citizen of the United States, resident of Minneapolis, county of Hennepin, State of Minnesota, have invented certain new and useful Improvements in articles such as Doughnut Machines, of which the following is a specification.

The object of my invention is to provide an improved apparatus in which doughnuts can be easily and rapidly cooked and thoroughly browned on both sides without any attention on the part of the user of the apparatus.

A further object is to provide a doughnut apparatus of large capacity and one which will be comparatively inexpensive to manufacture and put on the market.

In the accompanying drawings forming part of this specification,

Figure 1 is a plan view of a spiral doughnut machine embodying my invention;

Figure 2 is a vertical sectional view of the same;

Figure 3 is a plan view of another type of machine in which the doughnuts move back and forth across the machine instead of in a spiral path;

Figure 4 is a sectional view on the line 4—4 of Figure 5;

Figure 5 is a sectional view on the line 5—5 of Figure 3;

Figure 6 is a sectional view on the line 6—6 of Figure 3;

Figure 7 is a view of the device by means of which the doughnuts are reversed in position or inverted while traveling through the apparatus and during the cooking operation.

In the drawing, 2 represents a spout from which the doughnuts in the dough form are received from the doughnut machine. Below this spout is a broad, comparatively shallow casing 3 carried by suitable legs or supports 4. This casing is substantially cylindrical in form, and on one side has a tangentially arranged extension 5 in which a series of rollers 6 are arranged having a spiral pinion 7 in their peripheral surfaces. The doughnuts falling upon the rollers 6 are prevented from submerging in the grease and are allowed to expand freely before the dough is sealed by the hard shell on the exterior, resulting from the frying action of the grease. When the doughnuts pass off the rollers, they will float by themselves and are carried along in the grease into the casing 3 wherein by means of a spirally arranged partition 10, a spiral passage 11 is formed extending from the periphery to the center of the casing.

At the inner end of the spiral passage, a conveyer 12 is provided having multiplex rollers 13 which receive the doughnuts and elevate them out of the machine; the rollers each being operated at a suitable speed by a drive chain 14, and the walls of the spiral merging into the side walls of the conveyer so that the now thoroughly cooked doughnuts are automatically and positively directed to the discharge rollers from the spiral.

I prefer to use rollers at the receiving and discharge ends of the spiral for the reason that they do not carry the grease out of the casing but revolving on the longitudinal axis operate only to pass the doughnuts from one roller to another, the gap between the rollers being too large for the passage of grease from one roller to the next one.

The spiral passage is provided with a quantity of grease 15 that is kept hot by suitable means such as a heating agent or coil 16 mounted in the base 17 of the apparatus. At the center of the spiral, a discharge spout 18 is provided which leads to a receptacle 19, from which a spout 20 extends, having a receiving funnel 21 and a screen 22 therefor for straining or screening the grease, a conveyer 23 being provided opposite the strainer 22 for collecting the material which may gather thereon and lifting its out of the receptacle, continually at a rate faster than will allow the particles to burn and contaminate the grease 15.

The spout 20 extends to a suitable pump 24 and a pipe 25 leads therefrom to the bottom of the extension 5 discharging the grease therein and through the suction at the center of the spiral causing it to flow round and round through the apparatus following the walls of the spiral from the periphery to the center thereof. During this time, the doughnuts partially submerged in the grease will be thoroughly cooked.

For the purpose of cooking or browning both sides of the doughnut, it is customary to reverse or invert them, and as this can not in practice be done by hand where doughnuts are cooked in large batches, I provide a reversing device about midway of the spiral consisting of a metallic spout-like device 26 having an intake opening 27 and a discharge 28, the spout between the intake and discharge openings being twisted so that as the grease and doughnuts pass therethrough they will be turned over or inverted, emerging from the spout in a turned-over position from the one they assumed in entering the spout.

Approximately, all the grease in the spiral passage is compelled to pass through the inverting device, insuring the movement of the doughnuts therethrough and reliable operation. The speed of the grease through the inverting device is varied by raising or lowering the height of the inverter, thereby varying the ratio between the depth of the grease in the inverting device and the depth of the grease in the casing. From the position of the inverting device onto the end of the spiral, the under side of the doughnut submerged in the grease, will be thoroughly cooked and browned and when the doughnuts reach the end of the spiral and are delivered to the conveyer, they will be browned on both sides and ready for sale.

In Figure 3, I have shown a modified structure which consists in providing a casing 29 having parallel partitions 30 therein arranged to form a continuous passage 31 back and forth in the casing, one end of each partition terminating short of the wall of the casing so that a communicating passage 32 is formed through which the doughnuts and the grease move, passing from one side of the partitions to the other. The doughnuts, therefore, instead of traveling in a spiral will move back and forth in a straight line from side to side of the casing, the grease flowing around the ends of the partitions and carrying the doughnuts along in substantially the same manner as described with reference to the spiral apparatus. To the ends of the partitions 30 as shown in the drawing are attached wide or broad curves 33 at the point where the grease and doughnuts change their direction of movement, the bends or curves being formed by bending a piece of sheet metal of suitable pattern; the fold preventing the formation of an eddy in the grease and the consequent checking of the movement of the doughnuts. As constructed, the grease is deflected outwardly to the end wall of the casing, carrying the doughnuts along with it and insuring the rapid turning or reversing of the movement of the doughnuts at this point. About midway of the passage through the casing, I provide the reversing spout 26 corresponding to the one described with reference to Figure 7.

At the discharge end of the casing, rollers 34 are provided corresponding substantially to the roller feed of Figure 1 and driven from a suitable belt 35. At opposite ends of the passage through the casing, pipes 36 and 37 are connected with the pumping apparatus for feeding the grease slowly through the passage.

I claim as my invention:

1. A cooking apparatus having a passage therein for the flow of cooking liquid and articles to be cooked, and an inverting device provided in said passage comprising a spiral having intake and discharge openings, the articles being turned over or inverted in the passage through said spiral.

2. A cooking apparatus comprising a casing having a passage therein for the flow of cooking liquid and articles to be cooked, and a spout arranged substantially equidistant from the ends of said passage and being twisted to invert or turn over the articles passing therethrough.

3. A cooking apparatus comprising a casing having substantially parallel partitions therein forming passages on each side thereof, ports being provided at the ends of said partitions for the passage of the articles to be cooked from one side to the other, means for causing cooking liquid to flow through said passages from one side of the casing to the other, means for delivering the articles at the receiving passage and discharging them from the discharge passage, and a spiral inverting device arranged in one of said passages.

4. A cooking apparatus comprising a casing, parallel partitions arranged therein, a space being provided between one end of said partitions and the wall of said casing communicating with the passages upon opposite sides of said partitions, there being a continuous tortous passage from one side of the casing to the other, the ends of said partitions having means to prevent eddies of the cooking liquid at the turning point in said partitions, means for delivering the articles to be cooked to said passage and receiving them therefrom, and means for causing the cooking liquid to flow through said passage.

5. A receptacle adapted to contain a supply of cooking liquid and having a passage through which the cooking liquid is moved, and a pipe section arranged in said passage through which the articles to be cooked in the liquid are passed, said pipe section being adapted to invert such articles during their passage therethrough.

6. A receptacle adapted to contain a supply of cooking liquid and having a passage through which the liquid is moved, a twisted pipe section in said passage having receiving and discharge openings and arranged to receive the articles being cooked and impart a rotary inverting movement to each article passing therethrough.

7. A cooking apparatus having a passage for the flow of cooking liquid and articles to be cooked, and a spiral inverting device through which the articles being cooked are passed by the cooking liquid and turned over in passage while in the liquid.

8. A doughnut machine comprising a casing having a tortuous passage therein and adapted to contain a supply of grease, means for moving the grease through said passage, a plurality of rollers arranged at an incline, the lower rollers being submerged in the grease, the upper rollers receiving the doughnuts in dough form for delivering them to the grease, said rollers being spaced apart, and a screw geared to said rollers for operating all of them simultaneously, the lower rollers being positioned to temporarily support the doughnuts in the grease during the initial cooking thereof.

9. A cooking apparatus having a passage for the flow of cooking liquid and articles to be cooked, and a device adapted to impart a rotary turning movement to the articles to invert them by the flow of the liquid as they are carried along in the cooking liquid.

10. A cooking apparatus having a passage therein for the flow of cooking liquid and articles to be cooked, and an inverting device comprising a spiral, the articles being turned over or inverted in the passage through said spiral.

In witness whereof, I have hereunto set my hand this 12th day of October, 1922.

VERNE V. GUNSOLLEY.